United States Patent [19]
Paese et al.

[11] Patent Number: 6,067,673
[45] Date of Patent: May 30, 2000

[54] BATHROOM FIXTURE USING RADAR DETECTOR HAVING LEAKY TRANSMISSION LINE TO CONTROL FLUID FLOW

[75] Inventors: Andrew J. Paese; Steven M. Tervo, both of Plymouth; Carter J. Thomas, Cedarburg, all of Wis.; William R. Burnett; David C. Shafer, both of Menlo Park, Calif.; Fred Judson Heinzmann, Los Altos, Calif.

[73] Assignee: Kohler Company, Kohler, Wis.

[21] Appl. No.: 09/118,255

[22] Filed: Jul. 17, 1998

Related U.S. Application Data

[60] Provisional application No. 60/053,168, Jul. 18, 1997, and provisional application No. 60/052,960, Jul. 18, 1997.

[51] Int. Cl.[7] ...................................................... E03C 1/05
[52] U.S. Cl. .................................................. 4/623; 4/313
[58] Field of Search ............................... 4/623, 302, 304, 4/313

[56] References Cited

U.S. PATENT DOCUMENTS

| | | |
|---|---|---|
| 3,686,669 | 8/1972 | Toulis . |
| 3,796,208 | 3/1974 | Bloice . |
| 3,895,383 | 7/1975 | Korman . |
| 3,932,871 | 1/1976 | Foote . |
| 4,023,154 | 5/1977 | Comeaux . |
| 4,072,941 | 2/1978 | Hamid et al. . |
| 4,125,835 | 11/1978 | Barry . |
| 4,141,091 | 2/1979 | Pulvari . |
| 4,328,487 | 5/1982 | Cheal . |
| 4,358,759 | 11/1982 | Stewart et al. . |
| 4,402,095 | 9/1983 | Pepper . |
| 4,419,659 | 12/1983 | Harman et al. . |
| 4,433,328 | 2/1984 | Saphir et al. . |
| 4,567,484 | 1/1986 | Schilz et al. . |
| 4,642,641 | 2/1987 | Campbell . |
| 4,651,152 | 3/1987 | Harmuth . |
| 4,673,935 | 6/1987 | Spencer . |
| 4,697,184 | 9/1987 | Cheal et al. . |

(List continued on next page.)

FOREIGN PATENT DOCUMENTS

| | | |
|---|---|---|
| 0 353 183 A1 | 1/1990 | European Pat. Off. . |
| 30 08 025 | 9/1981 | Germany . |
| 39 20 581 | 1/1991 | Germany . |
| 196 08 157 A1 | 7/1997 | Germany . |
| WO 91/13370 | 9/1991 | WIPO . |

OTHER PUBLICATIONS

"A Probing Look At Emerging Technologies and the Strategic Markets They Create", *Futuretech*, 175:1–13 (Jul. 1994).

Stover, D., "Radar on a Chip, 101 Uses in Your Life ", *Popular Science*, 6 pgs. (Mar. 1995).

*Primary Examiner*—Henry J. Recla
*Assistant Examiner*—Huyen Le
*Attorney, Agent, or Firm*—Merchant & Gould P.C.

[57] ABSTRACT

Methods and devices for controlling the flow of fluid in fixtures, such as bathroom, restroom, or kitchen fixtures, using a radar detector with a leaky transmission line and fixtures using such methods and devices are provided. A bathroom fixture, in accordance with one embodiment of the invention, includes a fluid conduit, a radar detector for detecting one or more characteristics of one or more objects in a sensor field based on reflected electromagnetic signals from the one or more objects in the sensor field, and a controller coupled to the fluid conduit for controlling a flow of fluid in the fluid conduit in response to the detected one or more characteristics. The radar detector in particular includes a leaky transmission line for transmitting electromagnetic signals to form the sensor field and receiving the reflected electromagnetic signals. In accordance with one aspect of the invention, the sensor field is restricted from selected areas associated with spurious signals, such as areas of flowing water, areas near other fixtures, etc. The use of a radar detector with a leaky transmission line can, for example, improve the control of fluid flow in fixtures, such as bathroom fixtures.

18 Claims, 7 Drawing Sheets

U.S. PATENT DOCUMENTS

| | | |
|---|---|---|
| 4,742,583 | 5/1988 | Yoshida et al. . |
| 4,743,906 | 5/1988 | Fullerton . |
| 4,756,031 | 7/1988 | Barrett . |
| 4,797,621 | 1/1989 | Anderson et al. . |
| 4,891,649 | 1/1990 | Labaar et al. . |
| 4,921,211 | 5/1990 | Novak et al. . |
| 4,949,074 | 8/1990 | D'Ambrosia et al. . |
| 4,952,939 | 8/1990 | Seed . |
| 4,975,703 | 12/1990 | Delisle et al. . |
| 4,979,186 | 12/1990 | Fullerton . |
| 4,998,673 | 3/1991 | Pilolla . |
| 5,025,516 | 6/1991 | Wilson . |
| 5,030,956 | 7/1991 | Murphy . |
| 5,043,705 | 8/1991 | Rooz et al. . |
| 5,148,175 | 9/1992 | Woolfolk . |
| 5,150,123 | 9/1992 | Orlowski et al. . |
| 5,150,126 | 9/1992 | Knepper et al. . |
| 5,187,816 | 2/1993 | Chiou . |
| 5,187,818 | 2/1993 | Barrett, Sr. et al. . |
| 5,227,797 | 7/1993 | Murphy . |
| 5,243,717 | 9/1993 | Yasuo . |
| 5,311,189 | 5/1994 | Nagel . |
| 5,345,471 | 9/1994 | McEwan . |
| 5,361,070 | 11/1994 | McEwan . |
| 5,363,108 | 11/1994 | Fullerton . |
| 5,369,818 | 12/1994 | Barnum et al. . |
| 5,457,394 | 10/1995 | McEwan . |
| 5,457,990 | 10/1995 | Oswald et al. . |
| 5,465,094 | 11/1995 | McEwan . |
| 5,471,198 | 11/1995 | Newham . |
| 5,482,250 | 1/1996 | Kodaira . |
| 5,504,490 | 4/1996 | Brendle et al. . |
| 5,508,510 | 4/1996 | Laverty, Jr. et al. . |
| 5,510,800 | 4/1996 | McEwan . |
| 5,512,834 | 4/1996 | McEwan . |
| 5,517,198 | 5/1996 | McEwan . |
| 5,519,400 | 5/1996 | McEwan . |
| 5,521,600 | 5/1996 | McEwan . |
| 5,523,760 | 6/1996 | McEwan . |
| 5,541,605 | 7/1996 | Heger . |
| 5,543,799 | 8/1996 | Heger . |
| 5,563,605 | 10/1996 | McEwan . |
| 5,570,869 | 11/1996 | Diaz et al. . |
| 5,573,012 | 11/1996 | McEwan . |
| 5,576,627 | 11/1996 | McEwan . |
| 5,581,256 | 12/1996 | McEwan . |
| 5,589,838 | 12/1996 | McEwan . |
| 5,609,059 | 3/1997 | McEwan . |
| 5,610,611 | 3/1997 | McEwan . |
| 5,630,216 | 5/1997 | McEwan . |
| 5,661,305 | 8/1997 | McEwan . |
| 5,661,490 | 8/1997 | McEwan . |
| 5,682,164 | 10/1997 | McEwan . |
| 5,754,144 | 5/1998 | McEwan . |
| 5,757,320 | 5/1998 | McEwan . |
| 5,766,208 | 6/1998 | McEwan . |
| 5,767,953 | 6/1998 | McEwan . |
| 5,774,091 | 6/1998 | McEwan . |

BATHROOM FIXTURE USING RADAR DETECTOR HAVING LEAKY TRANSMISSION LINE TO CONTROL FLUID FLOW

The present application is related to U.S. provisional application Ser. No. 60/053,168, filed Jul. 18, 1997, entitled "Radar Detector Using Leaky Transmission Line" and U.S. provisional application Ser. No. 60/052,960, filed Jul. 18, 1997, entitled "Devices Utilizing Radar Detection of a User for Initiating Fluid Flow," which are both incorporated herein by reference.

FIELD OF THE INVENTION

The present invention is generally directed to the use of radar detection of an object or individual to control fluid flow. The present invention is in particular directed to methods and devices for controlling the flow of fluid in bathroom or restroom fixtures using a leaky transmission line and bathroom or restroom fixtures using such methods and devices.

BACKGROUND OF THE INVENTION

In light of concerns about public health and safety, the development of touchless controls on bathroom and restroom fixtures has received a large amount of attention. Germs, bacteria, disease, and other harmful materials may be spread from one person to another by touching the handles on toilets, urinals, sinks, and other fixtures in public and private bathrooms.

A variety of touchless control systems have been developed. The most common type of touchless control employs an infrared or, less commonly, a visible light detector for sensing a user. The detector typically provides signals that open or close an actuator, such as a valve, attached to a water inlet conduit of the fixture to, for example, flush a toilet or cause a stream of water to flow out of a faucet Infrared radiation can be detected passively by sensing heat from a user. Alternatively, infrared light can be emitted by a device, such as a light emitting diode (LED), and reflected off a user to an infrared detector, such as a photocell.

The use of infrared detection has several limitations. First, infrared radiation cannot penetrate most materials because of the short wavelength of the radiation. Thus, infrared emitters and detectors are typically either exposed or are positioned behind a window made of material that is transparent to infrared radiation. In addition, infrared sensors can be inadvertently or purposefully blocked by some material, such as paper, dust, or cloth, in front of the emitter or detector.

Another disadvantage of infrared detection is that the reflectivity of objects, such as clothing, may vary widely. Thus, the infrared detector must be sensitive to a wide variation in the strength of reflected signals. There is a risk that the detector may fail to detect a user with clothing or other articles that absorb or only weakly reflect infrared radiation.

These disadvantages of infrared detectors may cause faulty responses by the fixture (e.g., flushing of a toilet at an inappropriate time or constant flow of water in a toilet or sink) or may result in a failure to operate until the sensor area is cleaned or blocking objects are removed. Thus, there is a need for a new type of detector that can overcome these deficiencies of current detectors.

SUMMARY OF THE INVENTION

The present invention generally provides methods and devices for controlling the flow of fluid in bathroom or restroom fixtures (hereinafter "bathroom fixtures") using a radar detector with a leaky transmission line and bathroom fixtures using such methods and devices. The use of a radar detector with a leaky transmission line can, for example, improve the control of fluid flow in bathroom fixtures.

A bathroom fixture, in accordance with one embodiment of the invention, includes a fluid conduit, a radar detector for detecting one or more characteristics of one or more objects in a sensor field based on reflected electromagnetic signals from the one or more objects in the sensor field, and a controller coupled to the fluid conduit for controlling a flow of fluid in the fluid conduit in response to the detected one or more characteristics. The radar detector in particular includes a leaky transmission line for transmitting electromagnetic signals to form the sensor field and receiving the reflected electromagnetic signals. In accordance with one aspect of the invention, the sensor field is restricted from selected areas associated with spurious signals, such as areas of flowing water, areas near other fixtures, etc.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is directed to methods and devices for controlling fluid flow using radar. The invention is particular suited to controlling fluid flow in bathroom fixtures, such as toilets, sinks, urinals, bathing tubs, showers, and so forth, based on the detection of one or more characteristics (e.g., presence, position, motion, and/or direction of motion) of one or more objects (e.g., an individual) in a radar sensor field. For example, a fluid flow control device may be attached to a water inlet conduit of a toilet or urinal, the device using radar to detect the entry and exit of a user from a radar sensor field around the toilet or urinal and responding by flushing the toilet or urinal to remove waste after the user leaves. While the present invention is not so limited, details of the present invention will be illustrated through the discussion which follows.

One embodiment is a fluid flow control device which includes a radar detector with a transmitter for generating electromagnetic signals and a receiver for processing reflections of the electromagnetic signals. Coupled between the transmitter and receiver is a leaky transmission line which transmits the radar signals to form a sensor field and receives reflections of the electromagnetic signals generated by interaction between the signals and one or more objects within the sensor field. The fluid flow control device also includes detection circuitry coupled to the sensor to detect a characteristic of an individual within the sensor field. Examples of suitable characteristics include the presence of the individual in the sensor field, movement of the individual in the sensor field, direction of movement of the individual in the sensor field, or a combination thereof. An actuator, such as a valve, is typically coupled to the detection circuitry and configured for disposition in a conduit to control fluid flow through the conduit. The actuator opens and closes in a predetermined sequence in response to the detection circuitry.

This radar-controlled fluid flow control device allows for touchless control of a device, such as a toilet, urinal, sink, shower, bidet, or other fixture or appliance. The response of the device is typically dictated by the ordinary actions of the user. Such touchless controls are especially desirable in bathrooms such as public restrooms where there is a concern that harmful germs, bacteria, or disease may be transferred to subsequent users of the fixture. In addition, the fluid flow control devices of the invention may also be utilized in other situations, such as in bathrooms or kitchens of private homes, for a variety of reasons including the maintenance of sanitary conditions and convenience.

The invention is also directed to the use of such fluid flow control devices with fixtures, appliances, and devices, and in particular with fixtures used in bathrooms and restrooms including toilets, urinals, bidets, showers, bathing tubs, such as bathtubs and whirlpools, hand dryers, soap or lotion dispensers, sinks, and faucets, as well as with fixtures used in kitchens, such as sinks and faucets.

Figure 1:
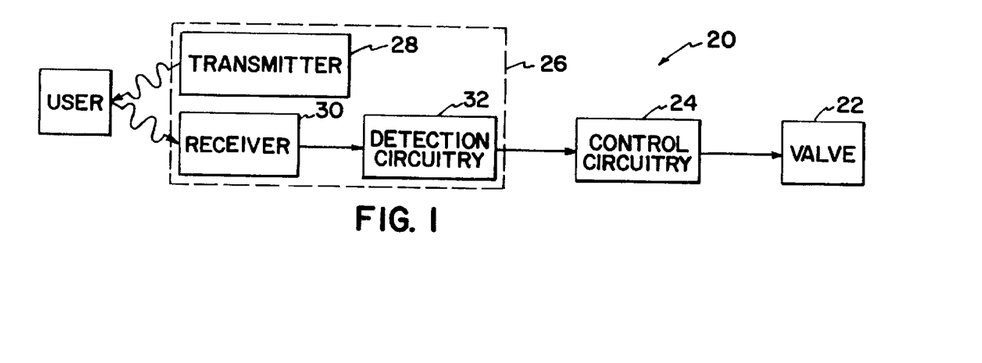
FIG. 1 is a schematic block diagram of an exemplary fluid flow control device according to one embodiment of the invention.

An exemplary fluid flow control device 20 is schematically illustrated in FIG. 1. Device 20 contains a control device or actuator, such as a valve 22, which is operated by control circuitry 24. A radar detector 26 sends input data to control circuitry 24 which then determines the appropriate response. Radar detector 26 typically includes a transmitter 28, a receiver 30, and detection circuitry 32.

Figure 2:
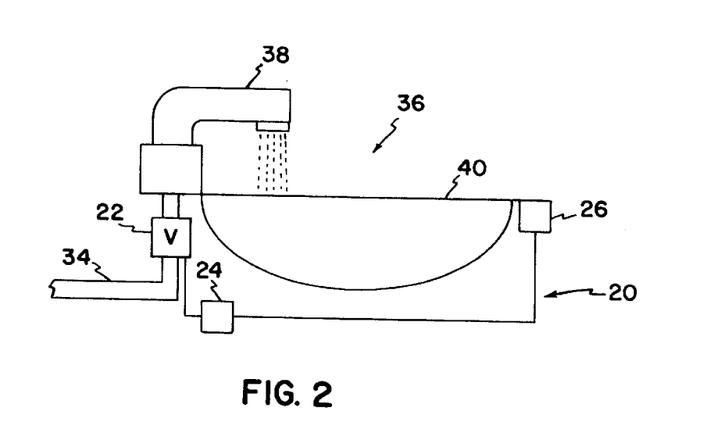
FIG. 2 is a side elevational view of an exemplary sink and faucet with the fluid flow control device of FIG. 1.

Typically, as shown in FIG. 2, actuator 22 is connected to a water inlet conduit 34 of a fixture 36, exemplified as a faucet 38 and sink 40, respectively. Actuator 22 is configured to open and shut to control fluid flow into and/or through the fixture. For example, fluid flow control device 20 may be used in conjunction with a faucet 38 and sink 40 to control the water flow through faucet 38 into sink 40. In this case, actuator 22 is typically connected within water conduit 34 or between water conduit 34 and faucet 38. In one embodiment, actuator 22 is opened and water flows through faucet 38 when a user is detected. Actuator 22 is closed and water stops flowing through faucet 38 when the user leaves. Other configurations of actuator 22 and other positions of actuator 22 with respect to the fixture may also be used.

An example of suitable control circuitry 24 includes a solenoid with an armature attached to actuator 22 to open or shut actuator 22 in response to signals from radar detector 26. For example, a current may be applied through the solenoid to move the armature and open the actuator. An opposing current or a spring, in the absence of current, may then be used to return the actuator to its closed position.

Control circuitry 24 may also include complex components such as a microprocessor which provide a programmed response based on the signals from radar detector 26. The programmed response may depend on the type of signal received (i.e., the presence of an individual or motion of an individual) or the sequence of received signals (i.e., two consecutive signals corresponding to entry and exit of an individual from a radar sensor field). To prevent false responses, a microprocessor-based controller may employ various software algorithms that use signal detection and statistical techniques, for example, signal averaging, to resolve signal-to-noise problems caused by spurious reflections and/or background clutter.

Radar detector 26 is a useful device for detecting an individual and/or actions of an individual in a sensor field. In general, radar detection is accomplished by transmitting a radar signal from a transmitter 28 and receiving reflections of the transmitted radar signal at receiver 30, the reflections arising from the interaction of the radar signal with an object. The strength of the reflected signal depends, in part, on the reflectivity of the object.

A variety of radar transmitters can be used. One type of radar transmitter continuously radiates an electromagnetic signal, often at a single frequency. One method for obtaining information from this signal is to measure the frequency of the reflected signal. If the object which reflects the signal is moving, the frequency of the reflected signal may be Doppler-shifted and provide motion and direction information. For example, an object moving away from the radar detector causes the frequency of the reflected signal to decrease and an object moving towards the detector causes the frequency of the reflected signal to increase. It will be appreciated that there are other continuous-wave radar systems and methods that can be used to obtain presence, position, motion, and direction information concerning an individual in the radar sensor field. These radar systems and methods may also be used in the devices of the invention.

Another type of radar system useful in practicing the invention is pulsed radar in which pulses of electromagnetic energy are emitted by a transmitter and reflected pulses are received by a receiver. One exemplary pulsed radar configuration is schematically diagrammed in FIG. 3. This radar system includes a pulse generator 50 which generates pulses at a pulse repetition frequency (PRF), a transmitter 52 which transmits the radar signal in response to the pulses, an optional transmitter delay circuit 53 for delaying the radar signal, a receiver 54 for receiving the reflected radar signal, an optional receiver delay circuit 56 for gating open the receiver after a delay, and signal processing circuitry 58 for obtaining the desired presence, position, motion, and/or direction information from the reflected radar signal.

Figure 3:
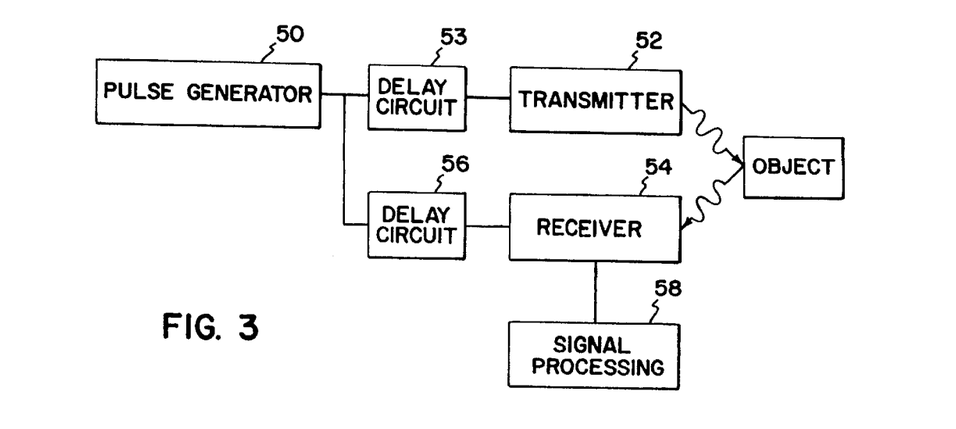
FIG. 3 is a schematic block diagram of an exemplary radar system in accordance with another embodiment of the invention.

In one type of pulsed radar, a burst of electromagnetic energy is emitted at a particular RF frequency, the length of the burst corresponding to multiple oscillations of the signal at the radar frequency. One example of a radar system using RF frequency radar bursts is described in detail in U.S. Pat. No. 5,521,600, incorporated herein by reference. In this particular radar system, the transmit and receive signals are mixed in receiver 54 before signal processing.

Figure 4:
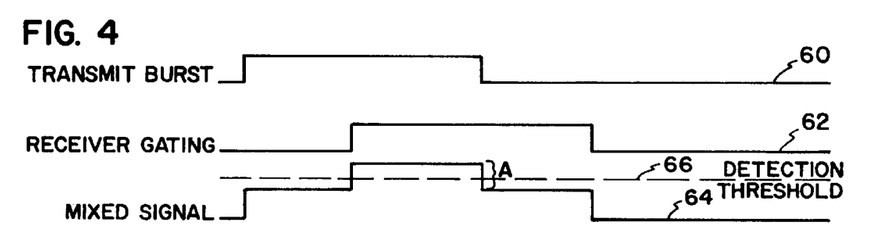
FIG. 4 is a timing diagram for an exemplary embodiment of the radar system of FIG. 3 which utilizes RF transmitter bursts.

An exemplary timing diagram for this particular radar system is provided in FIG. 4 which illustrates the transmitted RF burst 60, the receiver gating signal 62, and the mixed transmitter and receiver signal 64. The detection threshold 66 of the circuit may be set at a value high enough that only a mixed transmitter and receiver signal triggers detection. This radar system has a maximum detection range. Detectable signals arise only from objects that are close enough to the transmitter and receiver so that at least a portion of a transmitted burst travels to the object and is reflected back to the receiver within the length of time of the burst. The sensor field of this radar system covers the area within the maximum range of the radar system. Any object within that sensor field may be subject to detection.

Figure 5:
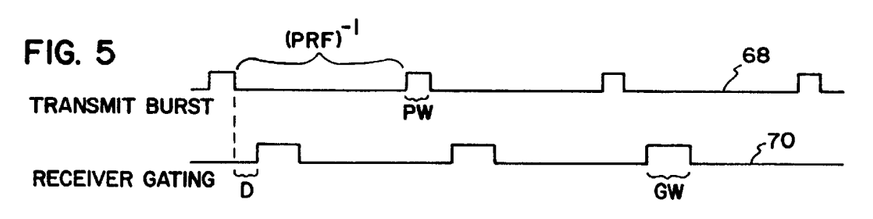
FIG. 5 is a timing diagram for another exemplary embodiment of the radar system of FIG. 3 which utilizes ultra-wideband (UWB) transmission pulses.

Another type of pulsed radar system is ultra-wideband (UWB) radar which includes emitting pulses having nanosecond or subnanosecond pulse lengths. Examples of UWB radar systems can be found in U.S. Pat. Nos. 5,361,070 and 5,519,400, incorporated herein by reference. These UWB radar systems are also schematically represented by FIG. 3. However, for UWB radar systems the timing of the transmit pulse 68 and receiver gating 70, illustrated in FIG. 5, is significantly different from the above-described RF-burst radar systems. Transmit pulses are emitted by transmitter 52 at a pulse repetition frequency (PRF) determined typically by pulse generator 50. In some embodiments, the pulse repetition frequency may be modulated by a noise source so that transmit pulses are emitted at randomly varying intervals having an average interval length equal to the reciprocal of the pulse repetition frequency. Receiver 54 is gated open after a delay period (D) which is the difference between the delays provided by the receiver delay circuit 56 and the transmitter delay circuit 53. In UWB radar systems, the transmit pulses have a short pulse width (PW), typically 10 nanoseconds or less. In addition, the receiver is usually gated open after the transmitter pulse period, in contrast to the previously described RF burst radar systems in which the receiver is gated open during the transmitter pulse period.

Figure 6:
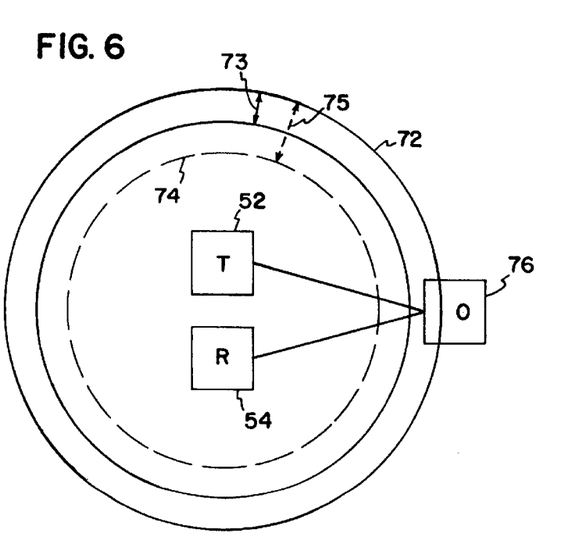
FIG. 6 is a schematic diagram of an exemplary detection shell of an ultra-wideband radar system using the timing diagram of FIG. 5.

In UWB systems, the delay period and length of the receiver gating and transmitter pulses define a detection shell 72, illustrated in FIG. 6. The detection shell defines the effective sensor field of the UWB radar system. The distance between the radar transmitter/receiver and the detection shell is determined by the delay period, the longer the delay period the further out the shell is located. The width 73 of the shell depends on the transmit pulse width (PW) and the receiver gate width (GW). Longer pulse widths or gate widths correspond to a shell 74 having greater width 75. Using UWB radar systems, characteristics of an object 76 in the shell, such as presence, position, motion, and direction of motion of an object, can be determined.

In some embodiments, two or more gating pulses are used. The gating pulses may alternate with each timing pulse or after a block of timing pulses (e.g., one gating pulse is used with forty timing pulses and then the second is used with the next forty timing pulses). In other embodiments, a controller may switch between the two or more gating pulses depending on circumstances, such as the detection of a user. For example, a first gating pulse may be used to generate a detection shell that extends a particular distance from the fixture. When a user is detected, a second gating pulse may be used which generates a detection shell that is closer or further away than the first shell. Once a user leaves this second detection shell, the fixture may be activated, for example, a toilet may be flushed. The controller then resumes using the first gating pulse in preparation for another user. In yet other embodiments, more than one gating pulse is provided per transmit pulse, thereby generating multiple detection shells.

A potentially useful property of some UWB transmitters is that the transmitter antenna often continues to ring (i.e., continues to transmit) after the end of the pulse. This ringing creates multiple shells within the initial detection shell 72 thereby providing for detection of objects between detection shell 72 and the radar transmitter/receiver.

In either the RF-burst or UWB radar systems, delay circuits 53, 56 provide a fixed or variable delay period. A variable delay circuit may be continuously variable or have discrete values. For example, a continuously variable potentiometer may be used to provide a continuously variable delay period. Alternatively, a multi-pole switch may be used to switch between resistors having different values to provide multiple discrete delay periods. In some embodiments, delay circuits 53, 56 may simply be a conductor, such as a wire or conducting line, between pulse generator 50 and either transmitter 52 or receiver 54, the delay period corresponding to the amount of time that a pulse takes to travel between the two components. In other embodiments, delay circuits 53, 56 are pulse delay generators (PDG) or pulse delay lines (PDL).

Figure 7:
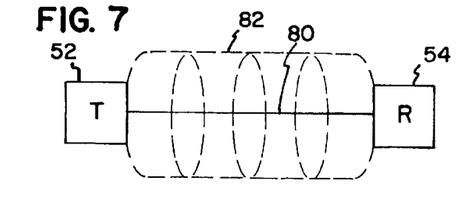
FIG. 7 is a schematic diagram of an exemplary radar system with a leaky transmission line in accordance with one embodiment of the invention.
Figure 10A:
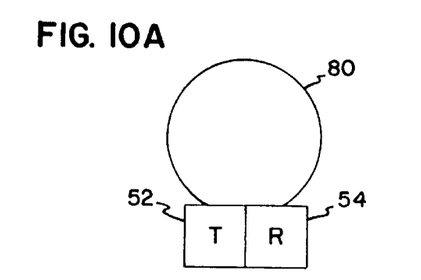
FIGS. 10A–10D are schematic block diagrams illustrating various exemplary pathways of the leaky transmission line of the radar system of FIG. 7.
Figure 10B:
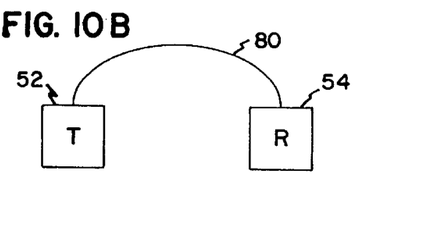
Figure 10C:
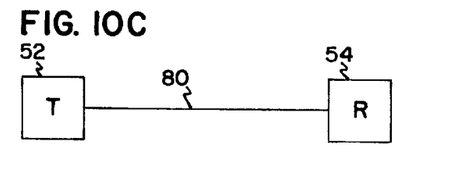
Figure 10D:
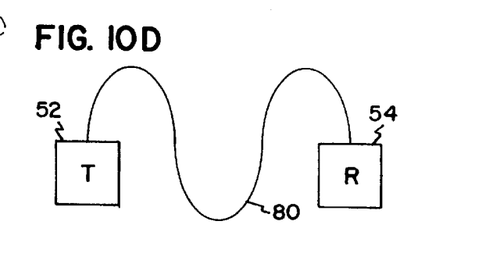

One useful configuration of transmitter 52 and receiver 54 is shown in FIG. 7. A leaky transmission line 80 connects transmitter 52 and receiver 54. Leaky transmission line 80 acts as an antenna for both the transmitter and receiver, emitting and receiving electromagnetic signals. In one embodiment, transmitter 52 and receiver 54 are spatially separated with transmission line 80 forming a curved (FIG. 10B), straight (FIG. 10C), or irregular (FIG. 10D) path between the transmitter and receiver. In another embodiment, transmitter 52 and receiver 54 are proximately disposed to each other and transmission line 80 forms a curved (FIG. 10A) or irregular path between the transmitter and receiver. In some cases, the curved path may have an approximately circular or ovoid shape.

Examples of suitable leaky transmission lines include a twisted pair, a twin lead transmission line, a co-axial cable, a micro-strip transmission line, a coplanar strip or wave guide transmission line, or a single wire Gaobau line. Leaky transmission line 80 is arranged and configured to emit and receive sufficient radiation to generate a detectable signal at the receiver. U.S. Pat. No. 5,581,256, incorporated herein by reference, illustrates a radar system which uses a leaky transmission line as an antenna.

Optionally, leaky transmission line 80 may contain portions that do not emit and/or cannot receive amounts of radiation that can be detected by the receiver. This permits selectively choosing which regions along transmission line 80 are to be sensed. One method for creating portions of transmission line 80 that do not emit or receive radar signals is to shield such portions using, for example, a metal sheath around the line.

Typically, leaky transmission line 80 generates a sensor field 82 around the transmission line for detection of objects in proximity to the transmission line 80. Sensor field 82 for a particular radar system depends on the type of radar used in the detector. For example, in the RF-burst radar systems, described hereinabove, sensor field 82 for each emitting point on the transmission line 80 is approximately spherical with a maximum sensor range defined by the burst width. In the UWB radar systems described hereinabove, sensor field 82 for each emitting point on the transmission line has the form of a detection shell located a particular distance from line 82 depending on the relative delay between the transmission pulse and the receiver gating pulse. The detection shell has a width that depends on the width of the transmission and receiver gating pulses.

In any radar system, sensor field 82 is a sum of the sensor fields generated at individual points along transmission line 80. Typically, sensor field 82 has an approximately tubular or cylindrical shape centered around transmission line 80.

Radar signals from sensor field 82 can be used to detect presence, position, motion, and/or direction of motion using any of the above-described radar methods. Because of their versatility, radar systems can detect various characteristics of an individual in a radar sensor field (i.e., within the radar's detection range). For example, the presence of an individual can be detected from the strength of the return signal. This return signal can be compared with a background signal that has been obtained in the individual's absence and stored by the detector.

Another type of presence detector includes a transmitter and receiver separated by a region of space. The receiver is only gated open for a period of time sufficient to receive a signal directly transmitted from the transmitter. If the signal is reflected or blocked, it either does not arrive at the receiver or it arrives after the receiver is gated closed. This type of detector is a "trip wire" that detects when an individual or a portion of an individual is interposed between the transmitter and receiver. Presence of an individual is indicated when the signal received during the gating period is reduced.

Position of the individual in the sensor field can be determined, for example, by sweeping through a series of increasingly longer, or later, receiver gating pulses. The detection of a reflected signal, optionally after subtraction of a background signal, indicates the distance of the individual away from the radar system. Motion of an individual can be determined by a variety of methods including the previously described Doppler radar system. An alternative method of motion detection is described in U.S. Pat. Nos. 5,361,070 and 5,519,400 in which a received signal is bandpass filtered to leave only those signals that can be ascribed to human movement through the sensor field. Typically, the bandpass filter is centered around 0.1–100 Hz.

U.S. Pat. No. 5,519,400 also describes a method for the determination of the direction of motion of an individual. This method includes the modulation of the delay period by ¼ of the center frequency of the transmission pulse. Quadrature information can be obtained and used to determine the direction of motion of an object in the sensor field (e.g., toward and away from the detector).

Another method for detecting direction of motion is to compare consecutive signals or signals obtained over consecutive periods of time. For many radar systems, the reflected signal strength increases as an individual moves closer. As the individual moves further away, the signal typically decreases. The comparison of successive signals can then be used to determine the general direction of motion, either toward or away from the radar detector. The control circuitry may not activate the actuator prior to confirming the direction of the user over a period of time (e.g. 3–10 seconds) to ensure that the user is moving toward or away from the fixture.

One or more characteristics of an individual in the sensor field, such as presence, position, motion, or direction of motion, may be simultaneously or sequentially detected by one or more sensors. This information may be coupled into the control circuitry which determines an appropriate action. A microprocessor may be used to control the actuator based on these multiple pieces of information It will be appreciated that other methods may also be used to determine the presence, position, motion, and direction of motion of an individual in a radar sensor field.

Fluid flow control devices utilizing radar detectors are useful in a wide variety of applications. Of particular interest is the use of such devices in bathroom fixtures, such as urinals, toilets, bidets, hand dryers, soap dispensers and faucets. Radar-control of fluid flow can facilitate the operation of these fixtures without active participation by the user. Instead the fixture operates in response to ordinary actions of the user including approaching the fixture, leaving the fixture, and placing a body part, such as a hand, in proximity to the fixture.

One advantage of using a leaky transmission line radar system is that the shape of the sensor field can be configured as desired by adjusting the path of the leaky transmission line. The sensor field can then be oriented around a desired detection region or oriented to avoid a region from which unwanted radar reflections may arise.

Figure 8:
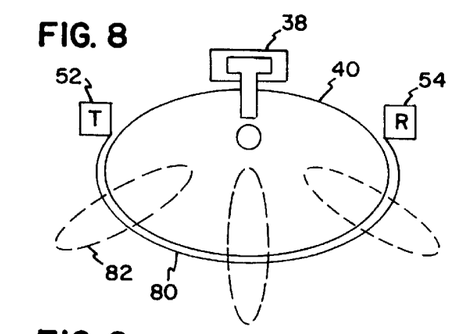
FIG. 8 is a top view of an exemplary sink using a leaky transmission line in accordance with another embodiment of the invention.

A particularly useful application which illustrates the versatility of the transmission line sensor field is a radar-controlled faucet 38 for use with a sink 40, as shown in FIG. 8. A leaky transmission line 80, connecting a radar transmitter 52 and receiver 54, can be wrapped around a portion of the outer rim of sink 40 to generate a sensor field 82 that includes the interior of sink 40. A fluid flow control device utilizing this type of radar system can then be used to detect when a user places a body part, such as the user's hands, into the sink. The fluid flow control device controls the flow of water based on the user's actions. For example, if the user places a portion of his body, such as his hands, or an inert object, like a comb or toothbrush, into sink 40, the fluid flow control device responds by allowing water to flow out of faucet 38. When the user removes his hands, the fluid flow control device halts the flow of water out of faucet 38.

The response of the fluid flow control device is dictated by radar signals received as the user intersects and moves within sensor field 82. Transmitter 52 may transmit continuous radar energy or may provide RF bursts or UWB pulses. Receiver 54 may include circuitry to detect signal fluctuations due to presence, position, motion, or direction of motion of the user within sensor field 82.

The shape of sensor field 82 can be used to overcome a significant difficulty in the design of radar sensors for faucets; namely, radar reflections from the stream of water flowing out of the faucet. If sensor field 82 includes the region of space through which the stream of water flows, a radar detector may not recognize that a user's hands have left the sink due to the high radar reflectivity of water. In this case, the radar signal is likely to be only slightly diminished, if at all, once the user leaves the sensor field 82.

The use of a leaky transmission line 80 as an antenna may overcome this difficulty because the sensor field 82 may be restricted to a region which includes portions of the sink in which a user's body parts are likely to be found, but does not include the stream of water. The restriction of sensor field 82 can be accomplished by, for example, limiting the amount of power that is transmitted along the transmission line 80 or, if pulsed radar techniques are used, by gating the receiver for a particular range, which excludes the stream of water.

Figure 9:
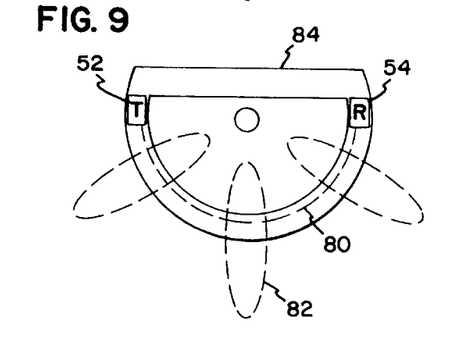
FIG. 9 is a top view of an exemplary urinal using a leaky transmission line in accordance with another embodiment of the invention.

FIG. 9 illustrates the use of a radar detector with a transmitter 52, receiver 54, and leaky transmission line 80 in a urinal 84. In one embodiment, illustrated in FIG. 9, leaky transmission line 80 is provided around an approach path or a portion of urinal 84 from which a user is expected to approach. In another embodiment (not shown), line 80 is provided only near a front portion of urinal 84. Sensor field 82 of line 80 should extend about 6–18 inches beyond urinal 84 to detect users. Transmitter 52 and receiver 54 may be positioned, for example, on the exterior of urinal 84, on plumbing or water inlet conduits attached to urinal 84, or on/in a wall to which urinal 84 is attached. In one embodiment, line 80 and, optionally, transmitter 52 and receiver 54 are positioned within the vitreous china or porcelain of the urinal 84. In another embodiment, line 80 is disposed around the outer surface of urinal 84 and, preferably, encased by an insulating material.

Figure 11:
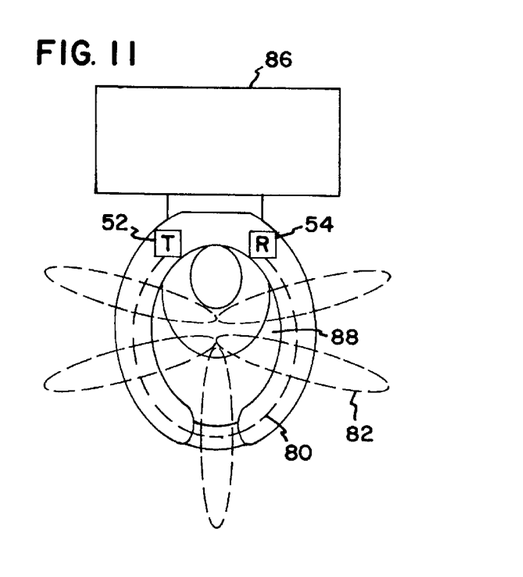
FIG. 11 is a top view of an exemplary toilet using a leaky transmission line in accordance with another embodiment of the invention.

FIG. 11 illustrates the use of a radar detector with a transmitter 52, receiver 54, and leaky transmission line 80 in a toilet 86. In one embodiment, line 80 is disposed around the portion of bowl 88 from which a user is expected to approach toilet 86. Sensor field of line 80 should extend 12–36 inches, and preferably 18–24 inches, beyond toilet 86 to detect users. Transmitter 52 and receiver 54 may be positioned, for example, on the exterior of toilet 86, on plumbing or water inlet conduits attached to toilet 86, or on/in a wall to which toilet 86 is attached. In one embodiment, line 80 and, optionally, transmitter 52 and receiver 54 are positioned within the vitreous china or porcelain of the toilet 86. In another embodiment, line 80 is disposed around the outer surface of toilet 86 and, preferably, encased by an insulating material.

The use of a leaky transmission line provides for a radar detector with a sensor field that can be shaped to fit the environment. This may permit the use of radar detection in situations where spurious signals may be generated For example, water flowing in a sink may cause reflections that confuse a radar detector. In addition, several fixtures near each other, such as in public restrooms, may interfere with each other. Use of a leaky transmission line as an antenna may provide for more directed radar emissions that can be constrained within a particular space, if the receiver is gated or if the radar signals beyond a certain distance produce reflections that have less than a threshold strength.

A radar sensor for use with a fluid flow device, or with any other device, can operate using either ac or dc power. Although in many cases the radar sensor may operate using available ac power from an outlet, it may be convenient to use battery power instead. For example, radar sensors operating in bathroom fixtures may not be conveniently or aesthetically connectable to an outlet. In such cases, a battery-powered radar sensor may be desirable. However, it is also desirable that the lifetime of the batteries in the sensor be measured on the order of months or years. Thus, the development of low power radar sensors is desirable.

Often pulsed sensors can use less power than those that operate continuously. Moreover, generally, the fewer pulses emitted per unit time, the less power needed for operation of the sensor. However, sensitivity often decreases with a decrease in pulse rate. In addition, it has been found that decreasing the pulse rate can also raise the impedance of a sampler in the receiver. This can place limits on the bandwidth of the sensor because even small amounts of stray capacitance can cause the frequency response of the receiver to roll off at very low frequencies. In addition, high output impedance may place stringent requirements on subsequent amplifier stages and provide a very susceptible point in the circuit for noise coupling.

Figure 12:
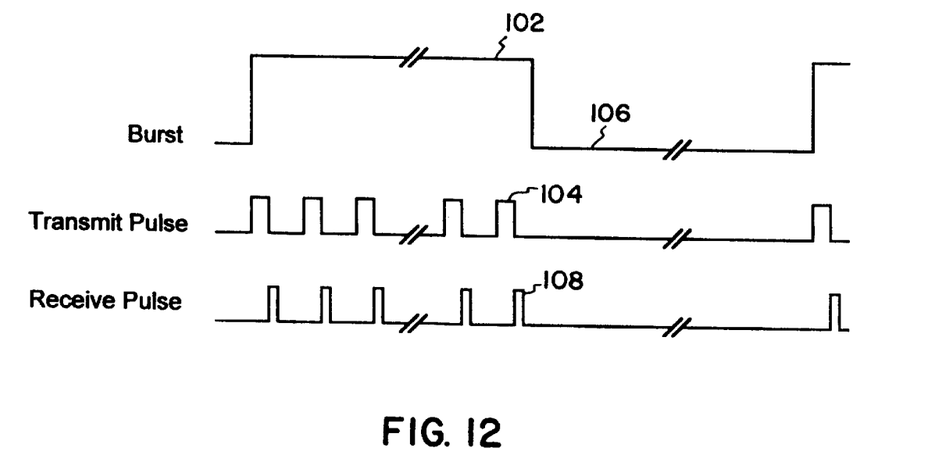
FIG. 12 is an exemplary block diagram of a burst-modified pulsed radar sensor.

A new low power radar sensor operates by providing radar pulses that are nonuniformly spaced in time. In operation, a burst 102 of pulses 104 is initiated in the transmitter, as shown in FIG. 12. Between each burst is a period 106 of rest time in which the transmitter is not transmitting RF energy. For example, a 1 to 100 microsecond burst of RF pulses may be made every 0.1 to 5 milliseconds. The RF pulses may be provided at, for example, a 0.5 to 20 MHz rate within the burst with an RF frequency ranging from, for example, 1 to 100 GHz. In this way, there is a relatively high pulse rate during the burst period, but with overall low power because the bursts only occur for 5% or less of the period between bursts. Although, the sensitivity of this radar sensor may be approximately the same as a radar sensor with the same number of pulses uniformly spaced in time, the impedance of the sampler during the burst period can be much less. In some embodiments, however, the burst period may be 10%, 25%, 50%, or more of the time between bursts.

Figure 13:
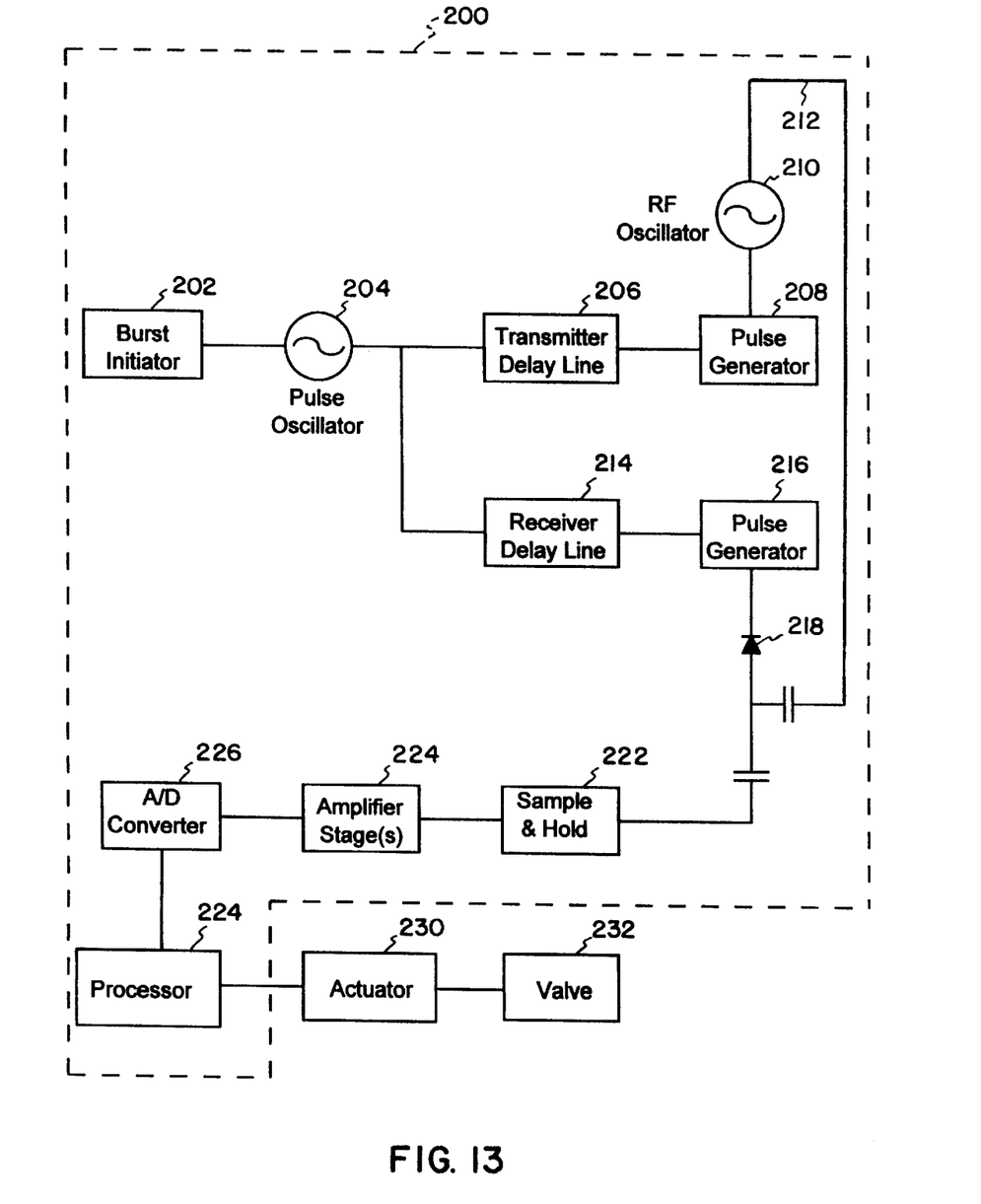
FIG. 13 is a block diagram of one exemplary embodiment of a low power radar sensor, according to the invention.

One exemplary low power radar sensor 200 which uses a leak transmission line is illustrated in FIG. 13. The radar sensor 200 includes a burst initiator 202 that triggers the beginning of the burst and may, optionally, trigger the end of the burst. A burst rate is defined as the rate at which bursts are provided. The burst width is the length of time of the burst. The time between bursts is the rest period. For many applications, the burst rate can range from, for example, 200 Hz to 10 kHz and often from, for example, 500 Hz to 2 kHz. The burst width can range from, for example, 1 to 200 microseconds and often from, for example, 5 to 100 microseconds. However, higher or lower burst rates and longer or shorter burst widths may be used The particular burst rate and burst width may depend on factors, such as the application and the desired power usage. An exemplary burst 102 is illustrated in FIG. 12.

The burst starts a pulse oscillator 204 that provides the triggering signals for each pulse. The pulse oscillator may operate at, for example, 0.5 to 20 MHz, and often from, for example, 2 to 10 MHz to provide, for example, 5 to 2000 pulses per burst. Higher or lower oscillator rates and larger or smaller numbers of pulses per burst may be used, depending on factors, such as, for example, the application and the desired power usage.

These triggering signals are provided along an optional transmitter delay line 206 to a pulse generator 208 that produces a pulse with a desired pulse length The optional transmitter delay line 206 may provide a desired delay to the transmission pulses to produce a desired difference in delays between the transmitter and receiver pulses. In some embodiments, the transmitter delay line 206 is used to provide a delay of, for example, one quarter wavelength of an RF oscillator frequency to allow for quadrature detection, as described below.

The pulse generator provides a pulse with a desired pulse length at each pulse from the pulse oscillator. The width of the pulse determines, at least in part, the width of the detection shell, as described above. The pulse width may range, for example, from 1 to 20 nanoseconds, but longer or shorter pulse widths may be used. An example of the pulses 104 from the pulse oscillator is provided in FIG. 12.

The pulse is then provided to an RF oscillator 210 that operates at a particular RF frequency to generate a pulse of RF energy at the RF frequency and having a pulse width as provided by the pulse generator 208 at a pulse rate determined by the pulse oscillator 204 during a burst period as initiated by the burst initiator 202. The RF frequency may range from, for example, 1 to 100 GHz, and often from, for example, 2 to 25 GHz, however, higher or lower RF frequencies may be used. The pulses of RF energy are provided to a leak transmission line 212, as described above. The short duration of the pulses typically results in the irradiation of an ultra-wideband (UWB) signal. In addition, the leaky transmission line 212 may ring, thereby providing multiple detection shells for each pulse.

The pulse oscillator 204, in addition to producing pulses for the transmitter, also provides pulses to gate the receiver. The use of the same pulse oscillator 204 for the transmitter and receiver portions of the radar sensor 200 facilitates timing between the portions. Pulses from the pulse oscillator 204 are sent to the receiver delay line 214 that delays the pulses by a desired time period to determine, at least in part, the distance of the detection shell from the radar sensor, as described above. The receiver delay line 214 may be capable of providing only one delay or a plurality of delays that can be chosen, as appropriate, to provide different radar ranges.

After being delayed, the pulses are provided to a receiver pulse generator 216 that generates a receiver pulse with a desired pulse width. The width of this pulse, as well as the width of the transmitter pulse, determine, at least in part, a width of the detection shell, as described above. Only during the receiver pulse is the receiver gated open, via, for example, a diode 218, to receive radar signals. The pulse width of the receiver pulse typically ranges from zero to one-half of the RF cycle time (e.g., zero to 86 picoseconds at a 5.8 GHz transmit frequency), and often, from one-quarter to one-half of the RF cycle time (e.g., 43 to 86 picoseconds at a 5.8 GHz transmit frequency). However, longer pulse widths may also be used. Receiver pulses 108 are only produced during the burst 102, as illustrated in FIG. 12. The receiver pulses 108 may or may not overlap with the transmitter pulses 104.

Receiver signals are received via the leaky transmission line 212, but these signals are only sampled during the receiver pulses. The sampling occurs at, for example, a sample and hold component 222. Typically, the sample and hold component 222 includes a gate that can be opened between bursts to isolate the remainder of the circuit. The receiver signal is then provided to one or more amplifier stages 224. Multiple amplifier stages may be used to provide simultaneous outputs from multiple transmitter and receiver delay line settings.

The signal is then provided to an optional A/D converter 226 which then sends a corresponding digital signal to a processor 228, for example, a microprocessor that evaluates the signal and provides a response. The processor 228 may operate an actuator 230 according to the converted receiver signal. For example, the processor may direct the actuator 230 to open or close a valve 232. Alternatively, the receiver signal may be analyzed using an analog processor (not shown) that may then operate the actuator.

It will be understood that this low power radar sensor may be used to operate devices other than an actuator or a valve. In addition, components such as one or more of the amplifier stages, the A/D converter, and the processor may be included with the radar sensor or they may be external to the sensor.

Figure 14:
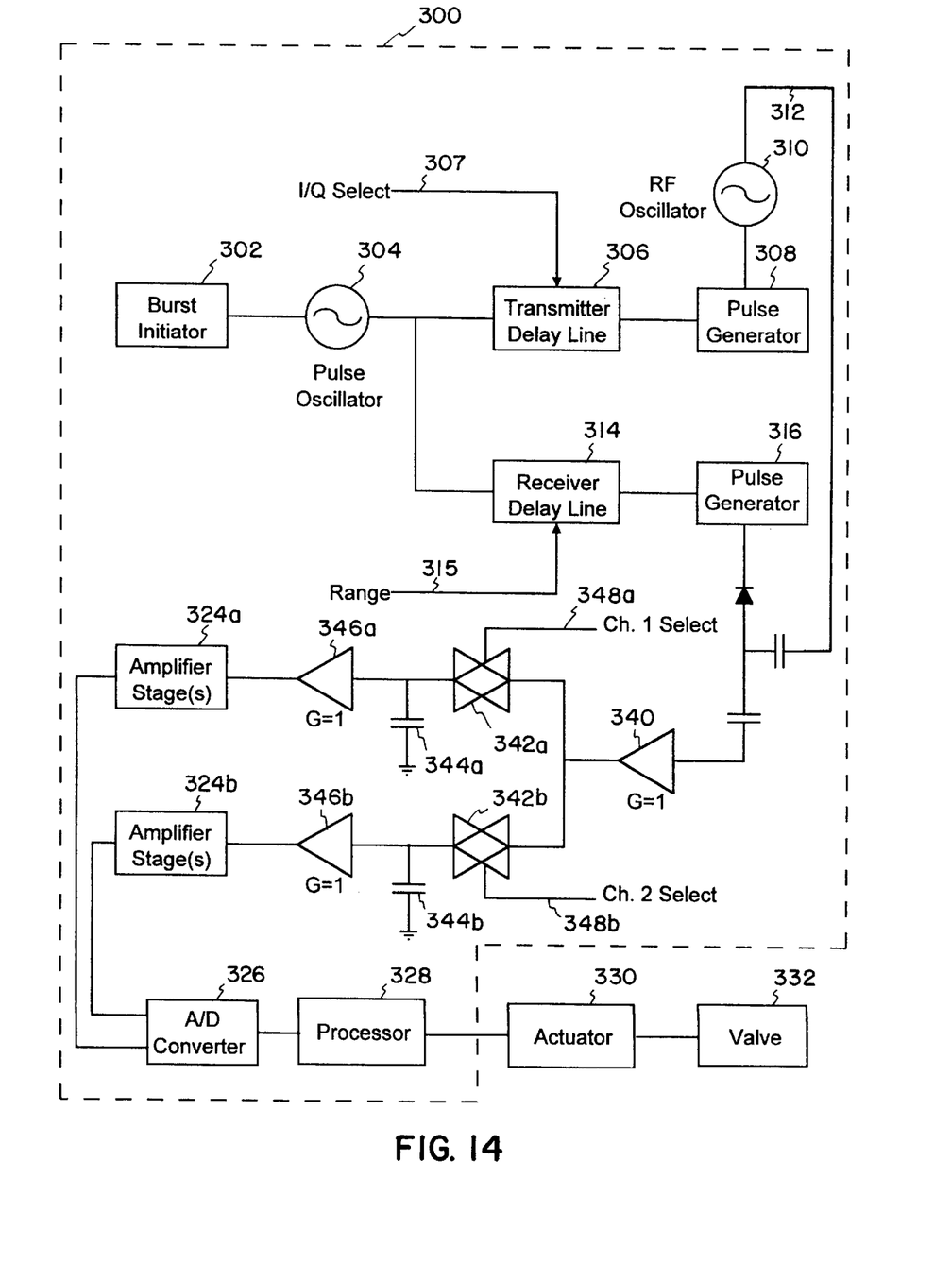
FIG. 14 is a block diagram of a second exemplary embodiment of a low power radar sensor, according to the invention.

Another exemplary low power radar sensor 300 which uses a leaky transmission line is illustrated in FIG. 14. The radar sensor 300 includes a burst initiator 302, pulse oscillator 304, transmitter delay line 306, pulse generator 308, RF oscillator 310, and a leaky transmission line 312, as described above for radar sensor 200. An I/Q select 307 is optionally provided on the transmitter delay line 306. The I/Q select 307 can change the transmission pulse delay by, for example, one quarter of a cycle of the RF frequency of the RF oscillator 310. This can be used for quadrature detection to enable determination of the direction of movement of an object within the sensor field. For example, during a first burst, the transmission pulse delay may be a first time and during a second burst the transmission delay may be a second time that is a combination of the first time and one quarter of the cycle time at the RF frequency. The radar sensor may continue to alternate; using the corresponding signals for quadrature detection to determine direction of movement In some embodiments, more than one burst may be provided before alternating or the alternation may occur during a burst.

The receiver portion of the radar sensor 300 includes a receiver delay line 314 coupled to the pulse oscillator 304, a pulse generator 316, and the leaky transmission line 312, similar to those described for radar sensor 200. An optional range select 315 is provided with the receiver delay line 314 to selectively alter the delay provided by the receiver delay line 314.

An exemplary sample and hold component coupled to the leaky transmission line 312 and pulse generator 316 is illustrated in this embodiment, however, other sample and hold components can be used. The sample and hold component includes a first buffer 340 (e.g., an operational amplifier with gain of about one), a gate 342a (e.g., a transmission gate), a hold capacitor 344a connected to ground, and a second buffer 346a.

This embodiment also illustrates the use of a two channel device with the second channel having a gate 342b, a hold capacitor 344b connected to ground, and a second buffer 346b. In this embodiment, both channels use the same first buffer, but individual first buffers could also be used. It will be understood that other embodiments may have only one channel or they may have three or more channels. Each channel has a channel select 348a, 348b coupled to the gate 342a, 342b to open and close the channel. All of the channels are typically closed between bursts and typically only one channel is open during each burst. This isolates the subsequent amplifiers except when a signal for a particular channel is received.

The signal from each channel is then passed through one or more amplifier stages 324a, 324b. The amplified signal can then be processed by, for example, analog circuitry (not shown) or by an A/D converter 326 and a processor 328. The processed signal can then be used to operate, for example, an actuator 330 to open or close a valve 332. It will be understood that the radar sensor can also be used for other purposes than operating an actuator and a valve.

In this radar sensor 300, the processor 328 may be a microprocessor that also operates as the burst initiator 302, I/Q select 307, range select 315, channel 1 select 348a, and/or channel 2 select 348b. Alternatively, one or more other microprocessors or other components can provide one or more of these functions.

Figure 15:
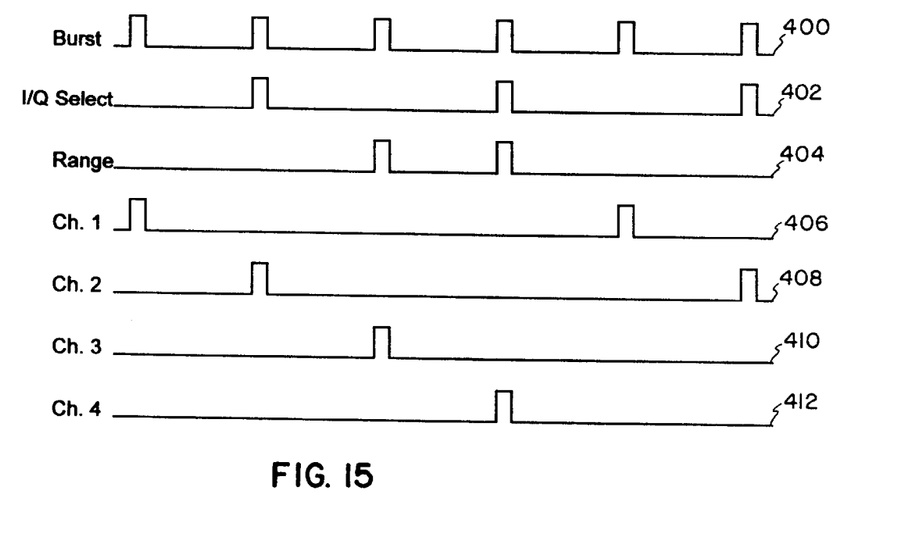
FIG. 15 is an exemplary timing diagram of a four-channel low power radar sensor, according to the invention.

An exemplary timing diagram for a four channel radar detector with in-phase and quadrature detection at a near and a far range is illustrated in FIG. 15. The burst channel 400 produces bursts at regular intervals according the burst rate. The I/Q select channel 402 alternates between in-phase (no signal in I/Q select channel) and quadrature detection (signal in I/Q select channel). The presence of a signal in the I/Q select channel can cause, for example, the transmission delay line to increase the delay of the transmission pulses by, for example, one-quarter of a wavelength of the RF frequency.

The range channel 404 allows for in-phase and quadrature detection at a near range (no signal in range channel) followed by in-phase and quadrature detection at a far range (signal in range channel). The presence of a signal in the I/Q select channel can cause, for example, the receiver delay line to provide a longer delay.

Each of the channel selects is operated one at a time to provide an appropriate signal through the appropriate channel. For example, as illustrated in FIG. 15, channel one 406 corresponds to in-phase detection at a near range, channel two 408 corresponds to quadrature detection (when combined with the signal from channel one) at a near range, channel three 410 corresponds to in-phase detection at a far range, and channel four 412 corresponds to quadrature detection (when combined with the signal from channel three) at a far range. In this particular embodiment, channel information is obtained at one quarter the burst rate.

The number of channels, their assignment to particular signals, the order of detection, the number of bursts before changing channels, and other similar aspects of the timing diagram can be altered. By using such timing mechanisms, a variety of different signals can be obtained and used to determine characteristics of an object, such as presence, motion, and/or direction of motion, in the sensor field.

One example of the use of a low power radar sensor for fluid flow control device is with a sink and faucet. A single channel or multi-channel (in which only one channel is actively used) device can be used to detect the presence or movement of a user in the radar field. A metered flow of water may be provided from the faucet when a user is detected. Alternatively, water may be provided until the presence or movement of the user is no longer detected. A similar sensor can also be used with a urinal, toilet, or a variety of other devices, including bathroom, restroom and kitchen fixtures.

Another example is a toilet. Two channels of a radar sensor are used to determine motion and direction of motion of a user. When the radar sensor detects a user moving away from the toilet after having previously detected a user moving toward the toilet, then the radar sensor can direct the toilet to flush. The radar sensor might also include more complex instruction, such as, for example, requiring a certain period of time that the user is detected approaching the toilet and a period of time between the approach to the toilet and movement away from the toilet before deciding that a valid flush condition exists. This configuration can also be used with faucets, urinals, and a variety of other devices, including bathroom, restroom and kitchen fixtures.

Yet another example utilizes three channels. The radar sensor is configured to detect motion at a far range, motion at a near range, and direction of motion at a near range. In the example of a toilet, the radar sensor knows to flush if the following sequence (or alternatively a subset of this sequence) occurs: 1) motion at the far range, 2)motion at the near range, 3) motion toward the toilet, 4) motion away from the toilet, and 5) motion at the far range. Again, the radar sensor may include more complicated instructions regarding the time of or times between these events. This configuration can also be used with faucets, urinals, and a variety of other devices, including bathroom, restroom and kitchen fixtures.

As noted above, the present invention is applicable to the control of fluid flow in a number of different fixtures. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A bathroom fixture, comprising:
   a housing defining a basin and a rim structure around the basin;
   a fluid conduit;
   a radar detector for detecting one or more characteristics of one or more objects in a sensor field based on reflected electromagnetic signals from the one or more objects in the sensor field, the radar detector including a leaky transmission line for transmitting electromagnetic signals to form the sensor field and receiving the reflected electromagnetic signals, the leaky transmission line being disposed along at least a portion of the rim structure around the basin; and
   a controller coupled to the fluid conduit for controlling a flow of fluid in the fluid conduit in response to the detected one or more characteristics.

2. The bathroom fixture of claim 1, wherein the leaky transmission line is disposed in an approach path to the bathroom fixture.

3. The bathroom fixture of claim 1, wherein the sensor field is restricted from a selected area.

4. The bathroom fixture of claim 3, wherein the selected area is an area associated with spurious signals.

5. The bathroom fixture of claim 4, wherein the bathroom fixture is a sink and the selected area is a space in which water flows.

6. The bathroom fixture of claim 4, wherein the selected area is an area associated with a different fixture.

7. The bathroom fixture of claim 1, wherein the leaky transmission line is encased by the housing.

8. The bathroom fixture of claim 1, wherein the one or more characteristics includes a presence of an object.

9. The bathroom fixture of claim 1, wherein the one or more characteristics includes movement of an object.

10. The bathroom fixture of claim 1, wherein the one or more characteristics includes movement direction of an object.

11. The bathroom fixture of claim 1, wherein the one or more characteristics includes entry and exit of an object.

12. The bathroom fixture of claim 1, wherein the one or more objects includes a person.

13. A bathroom fixture for use in a bathroom, comprising:
a fluid conduit;
a radar detector including:
a transmitter for generating electromagnetic signals;
a receiver for receiving reflections of the electromagnetic signals;
a leaky transmission line, coupled between the transmitter and receiver, for transmitting the electromagnetic signals to form a sensor field restricted from one or more areas associated with spurious signals associated with the bathroom and receiving reflections of the electromagnetic signals from interaction between the electromagnetic signals and one or more objects in the sensor field; and
a detection system, coupled to the receiver, for detecting one or more characteristics of the one or more objects using the reflections received by the receiver and generating an output signal; and
a controller coupled to the fluid conduit for controlling a flow of fluid in the fluid conduit in response to the detection system output signal.

14. The bathroom fixture of claim 13, further including shielding disposed about the leaky transmission line for restricting the sensor field from the one or more areas.

15. The bathroom fixture of claim 14, wherein the bathroom fixture is a sink and the one or more areas includes a space in which fluid flows.

16. The bathroom fixture of claim 13, wherein the electromagnetic signals generated by the transmitter restrict the sensor field from the one or more areas.

17. A method of controlling fluid flow of a bathroom fixture using a radar detector having a leaky transmission line, the bathroom fixture comprising a housing defining a basin and a rim structure around the basin, the method comprising:
transmitting electromagnetic signals to form a sensor field using a leaky transmission line disposed along at least a portion of the rim structure of the housing of the bathroom fixture;
receiving, with the leaky transmission line, reflections of the electromagnetic signals from interaction between the electromagnetic signals and one or more objects in the sensor field;
detecting one or more characteristics of the one or more objects using the reflections received by the leaky transmission line; and
controlling fluid flow in a fluid conduit of the bathroom fixture based on the detected one or more characteristics.

18. The method of claim 17, further including restricting the sensor field from one or more areas associated with spurious signals associated with a bathroom.

* * * * *

UNITED STATES PATENT AND TRADEMARK OFFICE
CERTIFICATE OF CORRECTION

PATENT NO. : 6,067,673
DATED : May 30, 2000
INVENTOR(S) : Paese et al.

It is certified that error appears in the above-identified patent and that said Letters Patent is hereby corrected as shown below:

<u>Title page,</u>
Item [56] References Cited, Foreign Patent Documents: insert -- 4 324 512 A1 1/1994 Germany -- in appropriate order Signed and Sealed this Thirteenth Day of November, 2001

Attest:

NICHOLAS P. GODICI
Attesting Officer  Acting Director of the United States Patent and Trademark Office